DIGITAL DATA TRANSMISSION SYSTEM WHEREIN A BINARY LEVEL IS REPRESENTED BY A CHANGE IN THE AMPLITUDE OF THE TRANSMITTED SIGNAL

Filed Sept. 14, 1965 4 Sheets-Sheet 1

JACK L. SHAGENA
JOSEPH C. KVARDA
INVENTORS

BY Kellman & Lamb

ATTORNEYS

JACK L. SHAGENA
JOSEPH C. KVARDA
INVENTORS

BY Kellman & Camb
ATTORNEYS

DIGITAL DATA TRANSMISSION SYSTEM WHEREIN A BINARY LEVEL IS REPRESENTED BY A CHANGE IN THE AMPLITUDE OF THE TRANSMITTED SIGNAL

Filed Sept. 14, 1965 4 Sheets-Sheet 3

INVENTORS
JACK L. SHAGENA
JOSEPH C. KVARDA

BY Killman & Lamb
ATTORNEYS

JACK L. SHAGENA
JOSEPH C. KVARDA
INVENTORS

BY Kilman & Camb

ATTORNEYS

United States Patent Office 3,459,892

Patented Aug. 5, 1969

3,459,892

DIGITAL DATA TRANSMISSION SYSTEM WHEREIN A BINARY LEVEL IS REPRESENTED BY A CHANGE IN THE AMPLITUDE OF THE TRANSMITTED SIGNAL

Jack L. Shagena, Baltimore, and Joseph C. Kvarda, Bel Air, Md., assignors to The Bendix Corporation, Towson, Md., a corporation of Delaware Filed Sept. 14, 1965, Ser. No. 487,148
Int. Cl. H04l 15/00
U.S. Cl. 178—68 10 Claims

ABSTRACT OF THE DISCLOSURE

A binary data transmission system utilizing a coding generator in the form of a forward-reverse counter, which counts logical ones in the data signal to a maximum count and then reverses to count to a minimum count. The count accumulated in the counter is weighed to generate a stepped analog signal correlative to the state of the counter. The analog signal is used to modulate a low frequency counter in a balanced modulator with the resultant lower sideband being transmitted to a receiver. At the receiver the received signal is detected and shaped to reconstitute the analog signal which is applied to a plurality of parallel connected Schmitt triggers which fire in accordance with the analog signal level. Schmitt trigger firings are sensed and applied to a phase locked clock to regenerate clock pulses at the original binary bit rate. The clock pulses are mixed with the Schmitt trigger outputs to regenerate the original binary data signal.

Means are also provided for increasing or decreasing the total count excursion of the coding generator and hence the peak to peak analog voltage and the number of voltage steps therebetween.

The present invention relates to data transmission systems. More particularly it relates to systems for converting digital data from binary form into a form more suitable for wire or radio transmission and for converting the transmitted data into the original binary form for utilization by the recipient.

The rate at which data can be transmitted is inseparably tied to the bandwith of the transmission channel. Theoretically, data in binary form can be transmitted at no greater rate than 2B bits per second, where B is the bandwidth of the channel in cycles per second. Studies have shown that such a rate is an absolute limitation upon the rate of transmission of information only so long as the information is transmitted in binary form. Binary data is characterized by the existence of information at only two levels. If the same information is transformed into a conventional multi-level signal the new limitation upon the data rate becomes 2B log 2 N bits per second, where N is the number of levels and B, as before, is the bandwidth with the transmission channel.

The theory offers the promise of a rate which can never be achieved in practice. It assumes first noiseless transmission and secondly that the number of levels can be increased indefinitely. Noise is present in any practical transmission system and all known means of signal level detection impose some tolerances upon their operation.

One object of the present invention is to provide means for coding binary data into a multilevel signal thereby increasing the rate at which data can be transmitted in a limited bandwidth channel.

The exchange of data in digital form between various business houses is becoming a common commercial practice. Ordinarily the data is transmitted over the same telephone lines used for voice communication. The nominal bandwidth of such line is 3 kc. However, these lines are not suitable for data transmission over a 3 kc. passband since their amplitude and phase characteristics deviate greatly from a distortionless line.

The three major characteristics of interest are the attenuation distortion, the envelope delay, and the character and amount of generated noise. These characteristics, in addition, vary with the type of telephone line used. For example, the attenuation distortion is considerably different for carrier systems than for wire lines and is also different for the various types of cable used in wire lines. It is obvious that the type of cable or number of carrier links cannot be selected arbitrarily when a telephone call is made. Dialing systems connect the subscribers by the trunk line available at the time of the call. Subscribers can never be assured therefore that the same line or even the same route will be continuously available between two stations.

Telephone calls are usually classified as local calls, short haul long distance calls (up to 400 miles), and long haul long distance calls (400 to 3000 miles). The telephone voice channel has a nominal passband from about 300 c.p.s. to 3300 c.p.s. If the bandwidth is defined in terms of the frequencies which have less than 20 db relative attenuation, then 90% of all circuits have bandwidths at least 2700 c.p.s. wide. However, if the bandwidth is defined in terms of the frequencies which have less than 0.5 milisecond of relative envelope delay, then 90% of all long haul long distance calls are at least 1200 c.p.s. wide. This is a consideralbe reduction from the nominal 3 kc. voice passband.

The envelope delay characteristics generally limit the amount of the passabnd that can be used for data transmission. The 0.5 ms. delay bandwidth can vary from approximately 1 kc. to 2.6 kc. To use this type of channel for high speed data service, extensive terminal equalization is required. The variation of transmission characteristics with time is small; and if a given channel is used continuously, frequent change in equalization is not required. If a compromise equalization network is used, it is possible to extend the minimum (for 90% of all calls) 0.5 ms. delay bandwidth from approximately 1.0 kc. to 1.4 kc.

Also frequency translation occurs in long haul voice channels due to the absence of frequency lock mechanisms in some carrier facilities. This frequency translation may vary from 2 c.p.s. to 20 c.p.s. depending on the particular equipment handling the call. This frequency translation is a problem to any modulation system using local frequency standards at the receiver terminal.

Telephone circuits exhibit many types of random fluctuations generally described as noise. These include thermal noise, vacuum tube and semiconductor noise, contact noise, induced power line hum, atmospheric disturbances, circuit interruptions, and crosstalk. From this wide assortment of causes, the net result is an almost constant, nearly random, low level steady-state noise, with intermittent high level transient disturbances. The distribution of the steady-state portion is almost random and its magnitude is a function of the time of day, the weather, the season, and the particular circuit. The medium signal-to-noise ratio, based on an average received signal level of —22 dbm., is 35 db. It appears, also, that up to six percent of all connections have a signal-to-noise ratio below 10 db.

Another object of the invention is to provide means for coding a binary data signal into a multilevel signal with a selectable number of levels thereby increasing the data rate to the maximum permitted by the noise. Thus, in a quiet channel, even though the bandwidth be considerably narrower than a noisy channel, still the data rate may be adjusted to exceed the maximum data rate of the noisy channel. For example, at four levels of coding, the maximum data rate attainable is six bits per cycle bandwidth, while for binary the maximum data rate is two bits per cycle bandwidth. Satisfactory operation, however, requires that the signal-to-noise ratio in the four level channel be 9.5 db above that of the binary channel. At six levels, the data rate may be increased to about 5 times that of binary provided the signal-to-noise ratio is at least 14 db greater.

To eliminate confusion in the description following the practical embodiment of the invention it is important to establish a definition of the level of the transmitted signal. The level of the transmitted signal is a distinctly identifiable state of the signal. For example, binary signals are two level signals. The two identifiable states of the signal, or levels, might be "off" representing a zero and "on," representing a binary one. Alternatively, a binary zero might be represented by a continuous tone having a fixed amplitude while a binary "one" would be represented by doubling the amplitude of the tone. Again, the two signal levels might be achieved by reversing the phase of a constant amplitude tone, as in phase shift keying telegraphs. Signal level comports signal amplitude only with respect to the baseband signal, i.e.the information signal. A carrier wave may be modulated in a number of ways to convey the information signal. A four level signal might be transmitted by a carrier wave having two distinct amplitudes and two distinct phases. A six level signal might be transmitted by modulating a carrier wave or tone signal at three amplitudes and two phases. A number of modulation means are available for transmitting the coded data signal. It should be recognized therefore that the method of modulation is a matter of choice.

The present invention achieves an increase in data rate by coding means which convert a binary signal into an analog signal. If, in the conversion, N logical ones are required to generate one cycle of the analog signal, the analog signal can be regarded as an M level signal theoretically capable of transmitting data at a rate for the same bandwidth (M−1) times greater than the binary rate. One consequence of such reduction in bandwidth requirements is a shift of the significant components of the signal spectrum towards lower frequency. Since telephone and radio circuits are not suitable for the transmission of low frequency signals, modulation means are required to elevate the low frequency of the baseband analog to a frequency within the passband of the transmission circuit. The benefit of bandwidth reduction remains, however.

Briefly, the coding means of the present invention comprises a forward-reverse counter to which the binary data signal is applied. Each logical one of the binary signal causes the counter to advance in count unit a preselected count is reached, whereupon succeeding binary logical ones cause the count to be reduced until the initial count, which it may be assumed is zero, is reached. Continuing logical ones cause the counter to repeat the cycle. Thus, if $N/2$ is the maximum count change of the counter, N logical ones are required to generate one counter cycle. The number of levels is accordingly increased from 2 to M and the data rate per cycle bandwidth becomes $N=2(M-1)$. Means are provided for converting the number stored in the counter to an analog voltage which controls the modulation of a carrier wave for transmission. At the receiver the carrier wave is demodulated to recover the analog baseband signal. This signal is then decoded to provide a binary data signal output.

Figure 1A:
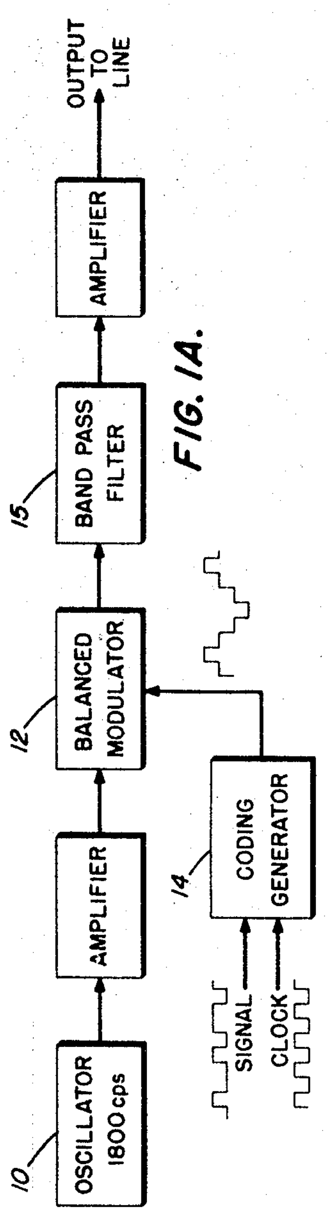
FIGS. 1A and 1B are, respectively, block diagrams of the data transmitter and the data receiver according to the invention.

FIG. 1 is a block diagram of a transmitter suitable for transmitting by telephone lines data signals coded in accordance with the invention. An audio oscillator 10 operates at a frequency near the frequency of minimum relative envelope delay for the transmission line. These frequencies may lie in the range of 1000 to 2000 c.p.s. The amplified output of oscillator 10 is applied as one input to a balanced diode ring modulator 12 which also receives as a control input the output of the coding generator 14. The waveform of the coding generator resembles a step-like triangular wave, the resemblance to a true triangular wave becoming more pronounced as the number of levels contained therein is increased. The output of the modulator is a combined amplitude modulated and phase shift keyed carrier wave. The amplitudes of the wave are dependent upon the number of output coding levels selected while the phase of the wave indicates the polarity of the levels. If two levels are selected, the coding generator output is of square waveform and the modulator output is a constant amplitude carrier wave in which the phase is reversed 180° for each binary one. If three output levels are selected for the coding generator, the first binary input one would produce carrier of one phase (1), the second binary one would cause the carrier to disappear and the third binary one would cause the carrier to reappear with opposite phase (−). The baseband waveform would be a positive step, a space at zero level and a negative step. Since one binary one is required to produce a single level change at the output of the coding generator, the three output levels of the coding generator are capable of conveying information at the rate of 4 bits/cycle bandwidth.

The output of modulator 12 passes through a bandpass filter 15 and an amplifier 16 to the transmission line. The equipment at the receiving end of the line appears in FIG. 1B, to which reference is now made.

Input to the receiver from the transmission line is through a bandpass filter 20 and a controlled gain amplifier 21. The output of amplifier 21 is applied to a full wave rectifier 22 which doubles the frequency of the carrier. This doubled frequency (3600 c.p.s.) is applied to a high Q tuned circuit 23 which rings at the doubled frequency. A zero crossing detector and squaring amplifier 24, which may comprise a Schmitt trigger circuit, shapes the output of the ringing circuit 24 into a constant amplitude square wave. This square wave is passed through a delay circuit 25, which provides a delay equivalent to a 90° phase shift at the 1800 c.p.s. carrier frequency, thence to a binary 26 which divides the frequency by 2. Circuit elements 22–26 produce a reference signal output, phased at 90° to the incoming signal, for use in a synchronous demodulator 27.

Figure 1B:
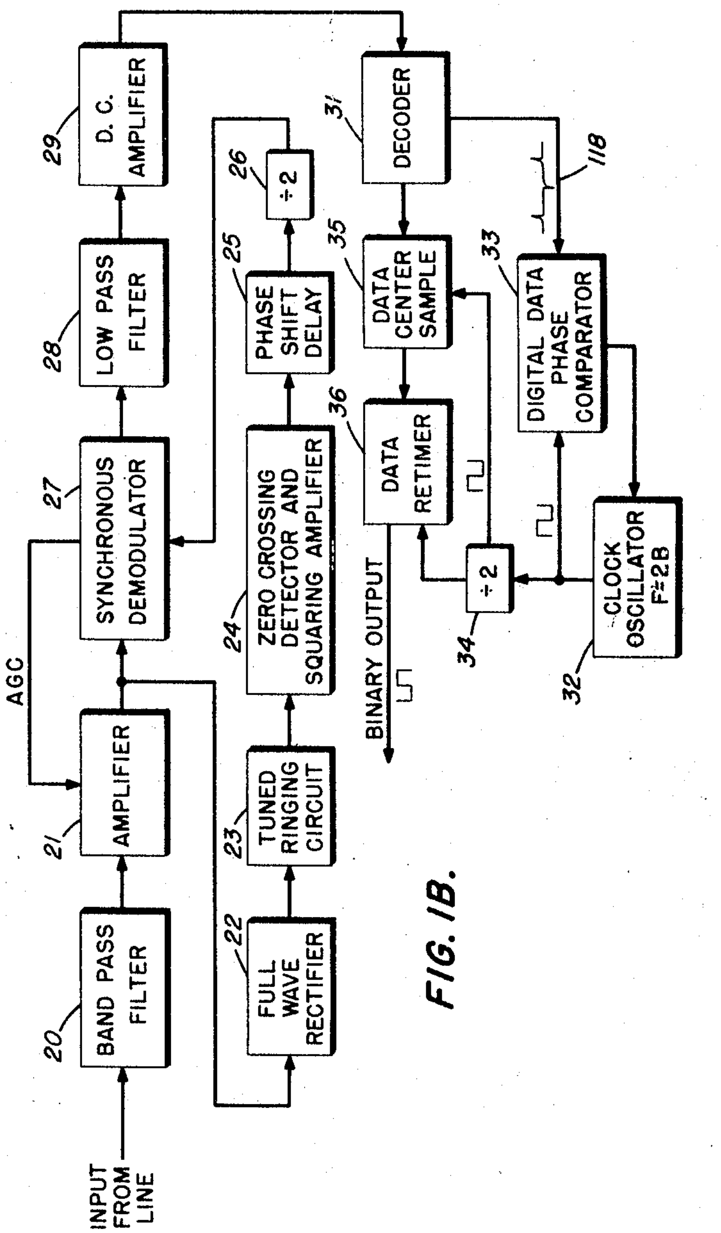

Demodulator 27 comprises a balanced phase detector which produces output of magnitude dependent upon the amplitude of signal from amplifier 21, and of polarity which depends upon the phase of the incoming signal relative to the reference signal. A low pass filter 28 rejects harmonics produced by the demodulator and yields at its output the baseband waveform which exists at the output of the transmitter coding generator 14. The recovered baseband waveform is amplified in a D.C. amplifier 29 and applied to the decoder circuit 31. The remaining elements 32–36 of FIG. 1B are for the purpose of retiming the data output.

Figures 2, 2A:
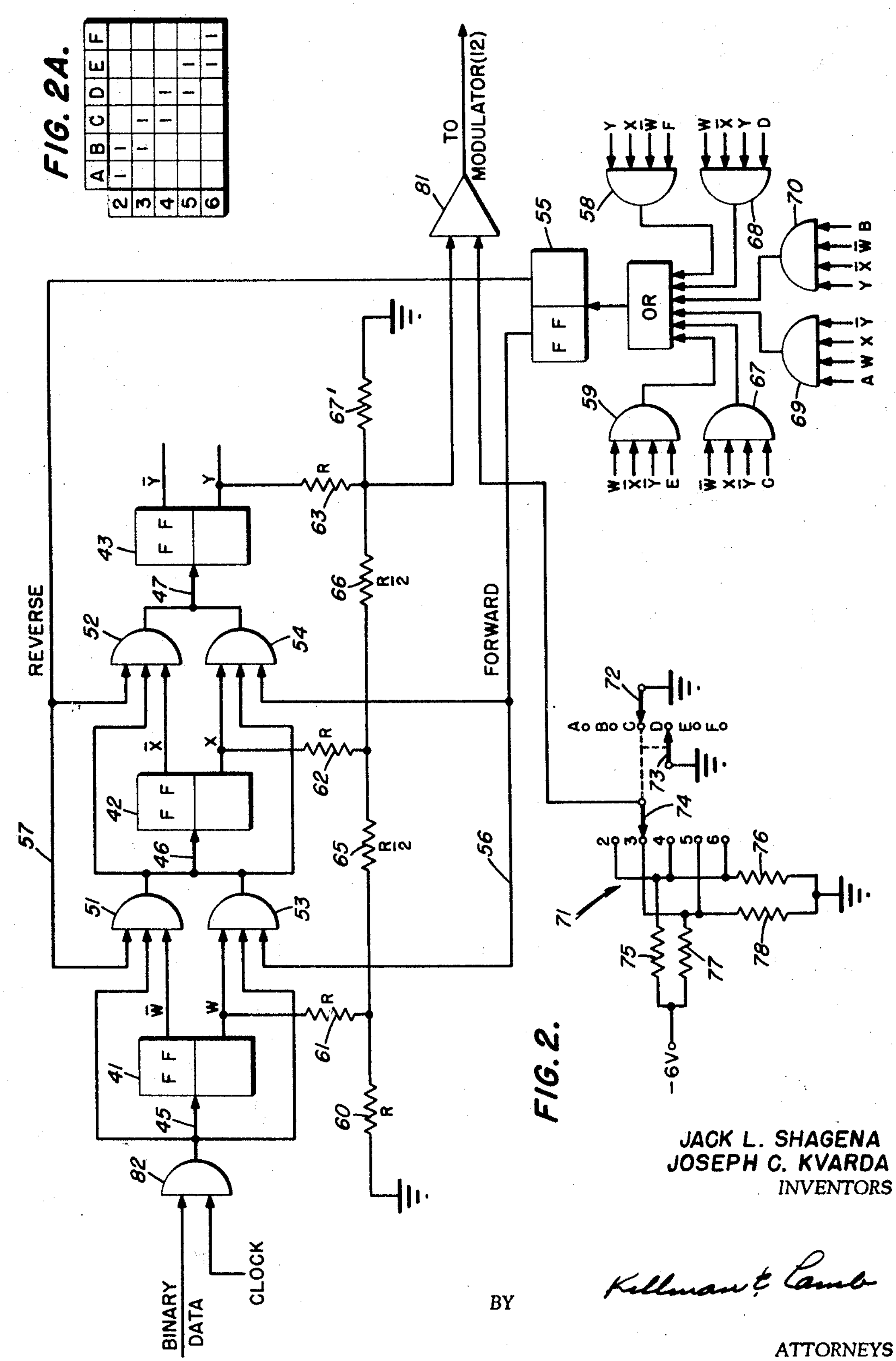
FIG. 2 is a block diagram of the encoder of FIG. 1A.
FIG. 2A is a chart indicating the relationship of the enablement of certain gates of FIG. 2 to the number of levels for the data transmission.

The coding generator 14 is shown in FIG. 2 as comprising a forward-reverse counter with gating means for selecting the counts per cycle. Three flip-flops 41–43, with toggle inputs 45–47 are coupled through "and" gates 51–54 to count upwards the alternations in the data signal input to a maximum of six and then reverse to count downward and so on. The direction of count is controlled by a flip-flop 55 which enables either "and" gates 53 and 54 through a "forward" bus 56 or "and" gates 51 and 52 through a "reverse" bus 57. The counter operation is as follows: Assuming flip-flops 41–43 are all set to zero, i.e. their complementary outputs $\overline{W}$, $\overline{X}$ and $\overline{Y}$ are on, and forward bus 56 is enabled. The first digit in the data signal toggles flip-flop 41, causing it to assume a complementary state (W on, $\overline{W}$ off). However, this digit does not affect flip-flop 46 or 47 because gate 53 was not enabled at the time of its appearance (W was then off). The count after the first alternation is, reading from right to left, 001 (Y off, X off, W on). The second data signal digit complements flip-flop 41 and is passed through the then enabled gate 53 to complement flip-flop 42. The count then stands 010 (Y off, X on, W off). The third digit complements flip-flop 41 but not flip-flop 42 because gate 53 is not then enabled. The count stands then at 011 (Y off, X on, W on). The fourth digit passes through enabled gates 53 and 54 to complement all three flip-flops. The count then stands at 100 (Y on, X off, W off). The count continues to advance until a count of six is accumulated (Y on, X on, W off). This count is read by an "and" gate 58 which receives X, Y and the complement of W, and an enabling voltage F. Flip-flop 55 is triggered to its complementary state thereby enabling reverse bus 57 and disabling forward bus 56.

The seventh input digit complements flip-flop 41 and passes through enabled gate 51 to complement flip-flop 42. The count then stands at 101 (W on, X off, Y on), or 5. Succeeding input digits cause the count to move downwards until a value of 001 is reached (Y off, X off, W on). "And" gate 59, which receives W, the complements of X and Y and an enabling voltage E, is then enabled, triggering flip-flop 55, enabling forward bus 56 and disabling reverse bus 57. The counter cycle then repeats.

A weighting network comprising resistors 60–63 of equal value connected to the W, X and Y outputs of the counter and coupled with half-value resistors 65 and 66 to a load resistor 67' develops across the load resistor the analog voltage of the count standing in the counter. That is, the voltage across resistor 67' increases in equal increments with each digit added to the count from a minimum negative value at count 1 to maximum value at count 6.

The data signal input to the counter is through an "and" gate 82 which combines the data with a clock signal to generate a binary alternation for each logical one to be transmitted. A series of logical ones thus causes the counter to generate a cyclical output. Logical zeros do not cause the counter to change count so that the output level of the counter remains constant when transmitting a zero.

An alternative coding scheme is available simply by omitting the "and" gate 82 and utilizing the data alone as the counter input. The coder output level will then change only when the data signal changes from a logical zero to a logical one. The decoder later to be described operates with the first mentioned coding scheme in which the transmitted signal level changes with each logical one in the data signal.

Fewer than six output levels may be selected by the means including "and" gates 67–70 and mode switch 71. Gates 67–70 are enabled in the order shown in the table of FIG. 2A to cause the counter to recycle at the selected output level. Mode switch 71 includes contacts A–F and ganged switch arms 72–74. Arms 72 and 73 ground pairs of contacts in the order of FIG. 2A and thus enable that pair of "and" gates 58, 59, 67–70 which receive the grounded contacts as an input. For example, if the output level selected is 2, arms 72 and 73 ground contacts A and B, thereby partially enabling gates 69 and 70. Gate 70 will be fully enabled at count 4 causing the counter to reverse direction. At count 3, gate 69 is fully enabled, causing the counter to move in a forward direction.

For two output levels, the voltage developed across load resistor 67' alternates between the value corresponding to count 3 and that corresponding to count 4. Since this voltage is unipolar, it is necessary to subtract a bias voltage therefrom equal to the median value of the voltage level for 3 and the voltage level for 4 in order to supply a bipolar voltage to the modulator 12. If three output levels are selected, gates 67 and 70 determine the operation of the counter, which then oscillate between the counts of 2 and 4. A bias voltage equal to the voltage level developed across load resistor 67' for a count of 3 is then required. This same value of bias voltage is required for all odd numbered output levels, while the former value of bias voltage is needed for all even-numbered output levels.

Bias is supplied by switch arm 74 to a D.C. amplifier 81 which combines the bias with the counter output voltage to produce bipolar, multilevel signals. Even numbered contacts are connected to a voltage divider formed by resistors 75 and 76. Odd numbered contacts are connected to the voltage divider comprised by resistors 77 and 78. The output of amplifier 81 is conducted to the modulator 12 which produces the combined amplitude and phase shift modulated signal earlier described.

Figures 3, 3A:
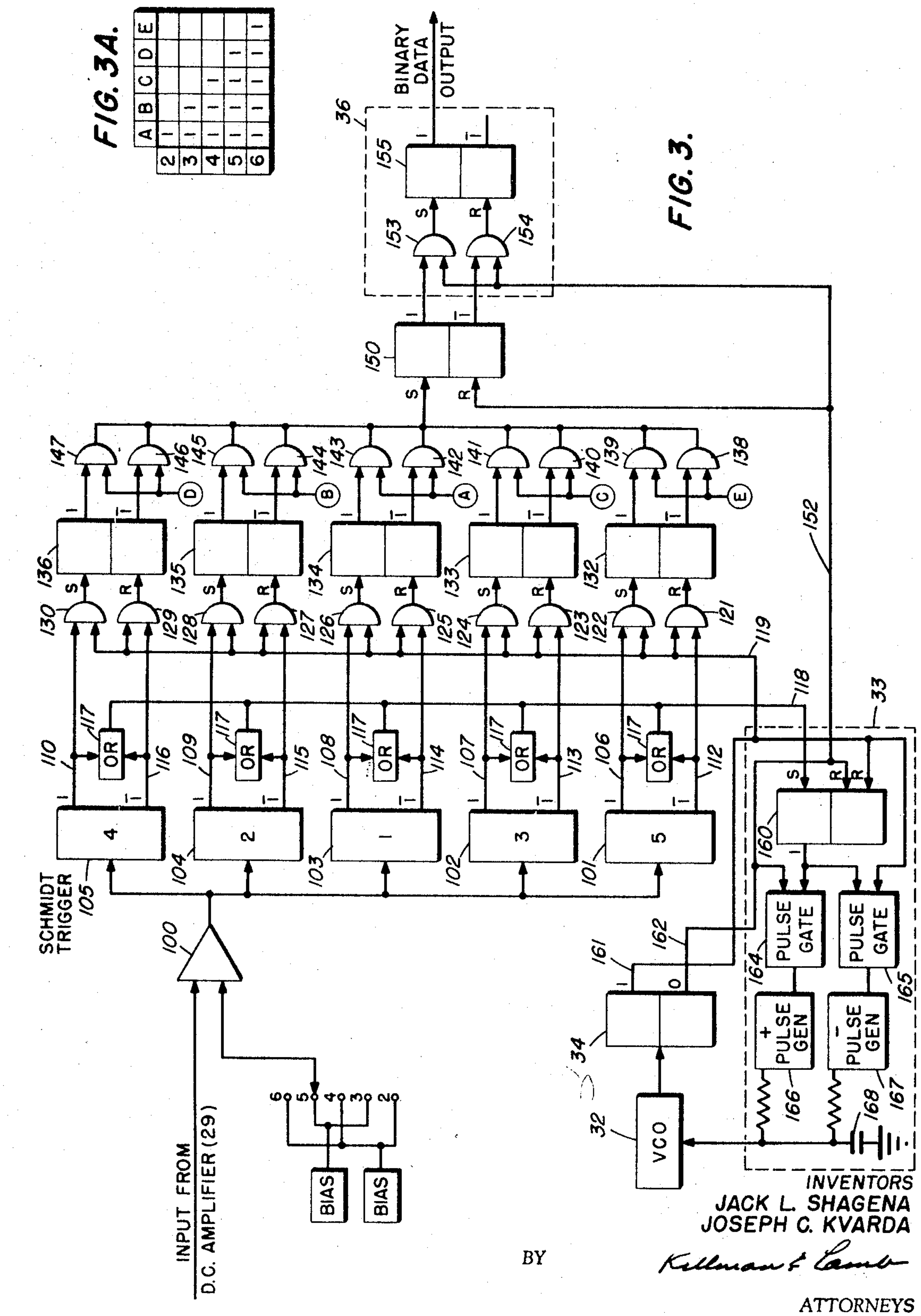
FIG. 3 is a block diagram of the decoder, clock and data retimer portions of FIG. 1B.
FIG. 3A is a chart showing the relationship of the enablement of certain gates of FIG. 3 to the number of signal levels transmitted.

The decoder 31, data center sampler 35, data retimer 36 and receiver block circuits including blocks 32, 33 and 34 of FIG. 1 will now be described with reference to FIG. 3.

The bipolar, multilevel signal recovered in demodulator 27 and amplified in amplifier 29 is converted to a unipolar multilevel signal by the addition of an appropriate amount of bias in amplifier 100. The output of amplifier 100 is applied simultaneously to a plurality of Schmitt trigger circuits 101–105 adjusted to fire at successively increasing signal levels. As long as the input signal amplitude exceeds the threshold adjustment of the trigger circuits, an output appears on the output line 106–110 associated with the actuated trigger circuit. When the input signal amplitude is below the threshold adjustment, output appears on the complement lines 112–116 associated with the non-actuated trigger circuits. Outputs from the ones lines 106–110 and ones complements lines are differentiated and supplied through "or" gates 117 to a local clock synchronizing line 118 leading to the digital data phase comparator. The means for generating local clock signals synchronized with the incoming data will later be described. For the moment, it will be assumed that such a clock signal is available on line 119. With each clock pulse, the state of the trigger circuits 101–105 is sampled by "and" gates 121–130 which are connected to set and reset inputs of flip-flops 132–136, causing those flip-flops to assume the state of the trigger circuits with which they are associated.

Both "ones" and "ones complement" outputs of flip-flops 132–136 are coupled through "and" pulse gates 138–147 to the set input of a flip-flop 150. Gates 138–147 are enabled according to the table of FIG. 3A to which reference should now be made along with FIG. 3. The letters A to E of FIG. 3A refer to similarly lettered terminals of FIG. 3, while the numbers 2 to 6 of FIG. 3A refer to the number of recognizable signal levels being received by amplifier 100 from amplifier 29. The index marks in the body of FIG. 3A indicate which of the aforementioned lettered terminals of FIG. 3 must be energized to properly decode the referenced multileveled signal. Thus, to decode a two level decoder input signal only terminal A must be energized, while to decode a six level input terminals A to E must be energized. Trigger circuits 101–105 are adjusted to respond to ascending signal levels, for example at 2.0 v. (trigger 101); 2.5 v. (trigger 102); 3.0 v. (trigger 103); 3.5 v. (trigger 104); 4.0 v. (trigger 105). If a two level signal is being transmitted the signal level oscillates about a value corresponding to count 3 and count 4 from the decoder of FIG. 2. It is only necessary to detect the transitions of trigger circuit 103, actuated by signal level corresponding to count 4 in order to decode the incoming signal. Suppose the incoming bit is a binary zero. Signal level corresponding to count 3 of the coder is present at the output of amplifier 100. Trigger circuits 101 and 102 are actuated. If a binary one is then transmitted the output of amplifier 100 rises to 3 v. Output from line 108 of trigger 103 causes flip-flop 134 to be set, causing output to pass through enabled gate 143 to set flip-flop 150. The opposite phase of the clock signal, present on line 152, causes flip-flop 150 to be reset at the center of the data bit interval and transfers the state of flip-flop 150 through "and" gates 153 and 154 to a data retiming flip-flop 155. Gates 153 and 154 and flip-flop 155 constitute the data retimer 36 of FIG. 1B. If the next data bit is a logical one, the level at the output of amplifier 100 drops below the 3 v. level, causing trigger 103 to revert to its complementary state. The complement pulse is passed through gate 125 to cause flip-flop 134 to reset. Gate 142 passes the complement output of flip-flop 134 to flip-flop 150, setting the latter to "one." In the ensuring half bit interval, gate 153 transfers the "one" output of flip-flop 150 to flip-flop 153. If the next data digit is a logical zero, the output of amplifier 100 does not change level and therefore none of the trigger circuits change state. Trigger 103 remains in a complement state, hence flip-flop 134 does not change state and no pulse will be transmitted to set flip-flop 150. The complement of flip-flop 150 is therefore transmitted by gate 154 during the data interval to reset flip-flop 155 to its complementary state, thus indicating the transmission of a logical zero.

The receiver clock oscillator is comprised of a voltage controlled oscillator 32 operating at twice the bit frequency, a flip-flop 34 for dividing the oscillator frequency down to the data bit frequency and a digital phase comparator 33 which supplies frequency control voltage to the oscillator 32.

In the phase comparator 33, a flip-flop 160 receives differentiated outputs from each of the "or" gates 117 on its "set" input so that each transition of triggers 101–105 causes the flip-flop to be set. Both phases of the clock signal, present on lines 161 and 162 from flip-flop 34, cause flip-flop 160 to be reset. The output of flip-flop 160 is applied to two pulse gates 164 and 165 of the "and" type which each also receive as a second input opposite phases of the clock signal from flip-flop 34. Pulse gates 164 and 165 control opposite polarity pulse generators 166 and 167 which feed an integrating capacitor 168. If the incoming data should occur early, i.e. the clock frequency is too low, flip-flop 160 will be set at the time one of the gates, say gate 165, is enabled. This actuates pulse generator 167 to produce a pulse of such polarity as to cause the frequency of oscillator 32 to increase. These pulses are accumulated in capacitor 168 which in time acquires a voltage sufficient to adjust the frequency of oscillator 32 to equal twice the bit frequency. Then the frequency of the output of flip-flop 34 equals the bit frequency and the incoming data will cause flip-flop 160 to be set at a time coinciding with the leading edge of the clock pulses on lines 161 and 162. For a small increment of time about the leading edge of the clock pulses, either both gates 164 and 165 are enabled, or neither gate is enabled, but in either event it is clear that no change will then occur in the voltage of capacitor 168, because either two pulses of opposite polarity are applied to the capacitor or no pulse at all is applied. If the frequency of oscillator 32 is initially too high, phase comparator operates in the same manner as just described but in the opposite direction causing the frequency of the output of flip-flop 34 to be lowered to a value equaling the bit frequency of the incoming data.

Figure 4:
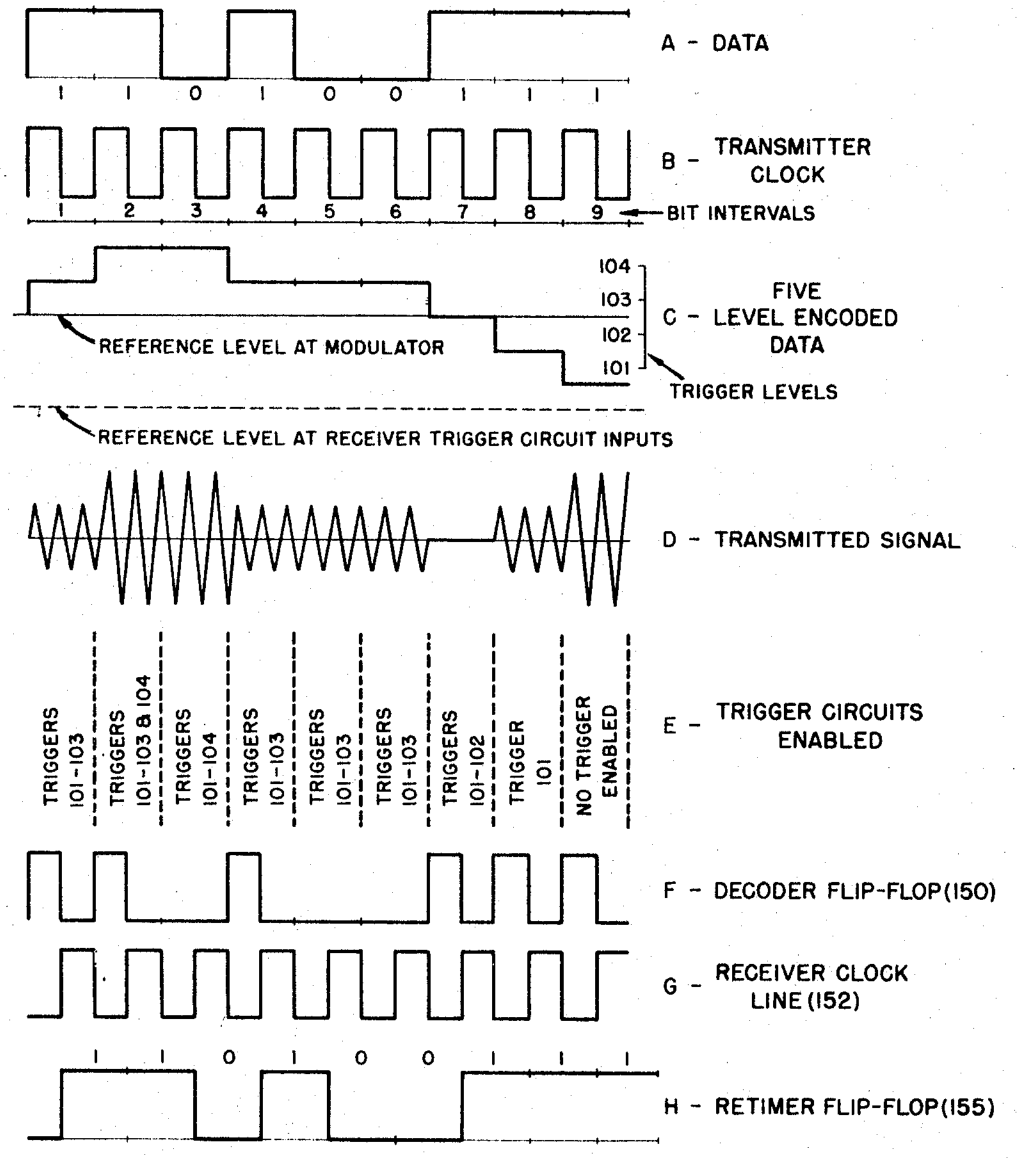
FIG. 4 is a timing waveform diagram useful in explaining the operation of the invention.

Understanding the operation of the invention will be facilitated by the timing waveform diagrams of FIG. 4. The input data may be that shown on line A which represents the binary number 11010011. When the data input is a logical 1, a positive clock pulse (line B) causes the counter of the encoder to move one digit. The digit may increase the count standing in the counter or decrease it, depending on whether the counter is in a forward or reverse condition. When the data input is a logical zero, no change occurs in the count of the counter.

Referring to line C, in the first bit interval, the "one" input causes the counter to move up one digit, as does the second "one" input during the second bit interval. The third bit is a zero so no change occurs in the count. The fourth bit is a "one,'" but the counter reached full count upon the preceding "one" input and has now reversed. The level therefore decreases for the fourth bit input. The fifth and sixth bits are zeros. No change occurs in the counter. The seventh, eighth and ninth bits are all "ones," each causing the counter to move downward one level, the ninth bit also enables the counter in the forward direction because five levels have been traversed since the full count reached during the second bit.

The modulation of the carrier is shown on line D. Positive levels of the encoder, of which there are two, are transmitted by two carrier levels. Negative levels of the encoder, also two, are transmitted by the same two carrier levels but with reversed carrier phase.

The receiver demodulator output is of the same form as shown on line C. For decoding, bias is added to shift all levels of the demodulator output above the dashed-line reference level shown on line C. These levels cause trigger circuits 101–104 to be actuated as shown on line E. Since the transitions of the trigger circuits from one state to another, rather than their state, i.e. "on" or "off,'" cause flip-flop 150 to be set, one less trigger circuit is required than the number of levels of the demodulator output. On line F is seen the output of flip-flop 150 and which illustrates that this flip-flop generates an output pulse whenever the collective state of Schmitt triggers 101 to 105 changes. In other words, whenever an incoming data bit received from amplifier 29 causes a Schmitt trigger to fire or be extinguished, flip-flop 150 generates an output pulse, while an incoming data bit which does not change the state of any Schmitt trigger will not effect flip-flop 150 at the middle of the bit interval to flip-flop 155. The output of flip-flop 155, as seen on line H, shows a reconstruction of the original data on line A.

Obviously many modifications of the invention are possible in the light of the above teachings. The invention is to be regarded as limited solely by the scope of the appended claims.

The invention claimed is:

1. A binary digital data transmission system wherein said binary data comprises bits of first and second level comprising,

- encoding means responsive to binary input data first levels for generating an analog voltage which increases incrementally from a minimum to a maximum and then decreases incrementally from said maximum to said minimum, the peak-to-peak amplitude of said analog voltage being proportional to any preselected number of said first level bits;
- means for selecting said any preselected number of first level bits;
- modulation means for impressing said analog voltage upon a carrier wave;
- means for transmitting said modulated carrier wave;
- a receiver including a demodulator for receiving said transmitted wave and reproducing the analog voltage thereon; and
- a decoder at said receiver including means responsive to each change of level of said reproduced analog voltage for generating a digital data bit.

2. A digital data transmission system as claimed in claim 1 wherein said encoder comprises,

- a counter arranged to advance in count with each first level bit input until a preselected maximum count is reached;
- means actuated upon the accumulation of said preselected count in said counter causing said counter thereafter to reduce count; and means providing an output voltage proportional to the value of the count in said counter.

3. A data transmission system as claimed in claim 2 including a clock oscillator at said receiver and means controlled by received digital data for synchronizing clock pulses generated by said clock oscillator with the bit rate of said data.

4. A data transmission system as claimed in claim 3 wherein said decoder includes a plurality of trigger circuits each responsive to said reproduced analog voltage modulation and arranged to change state at predetermined levels of said reproduced analog voltage; and, means responsive to said clock pulses for sampling the state of said trigger circuits so as to reproduce said binary data.

5. A data transmission system as claimed in claim 4 wherein said means responsive to said clock pulses comprises, a plurality of first flip-flop circuits;

logic means for setting said flip-flop circuits in accordance with the state of said trigger circuits upon appearance of a synchronizing clock pulse signal from said clock oscillator;

a second flip-flop circuit;

a plurality of pulse gates for collectively applying the outputs of said first flip-flop circuits to said second flip-flop circuit to cause said second flip-flop circuit to be set upon the change of state of any of said first flip-flop circuits;

means for resetting said second flip-flop circuit upon the appearance of a subsequent synchronizing clock pulse signal from said clock oscillator; and bistable means responsive to said clock pulses for sampling said second flip-flop circuit so as to reproduce as output said binary data.

6. A data transmission system as claimed in claim 5 including means receiving the outputs of said trigger circuits for adjusting the frequency of said clock oscillator.

7. A digital data transmission system as claimed in claim 2 wherein said counter includes a plurality of toggle input flip-flop circuits arranged to change state from one condition to a complementary condition upon the appearance of signal at its input;

a first plurality of logic circuits separating successive ones of said flip-flops for coupling to the input of a succeeding flip-flop the output of the first preceding flip-flop together with the output of the second preceding flip-flop;

a second plurality of logic circuits separating successive ones of said flip-flops for coupling to the input of a succeeding flip-flop the complement of the output of the first preceding flip-flop together with the complement of the second preceding flip-flop; and third logic means for testing the number represented by the conditions of all of said flip-flops and for enabling said first and second plurality of logic circuits in alternation upon the appearance of first and second preselected numbers in said counter.

8. A data transmission system as claimed in claim 1 wherein said modulation means comprises a balanced modulator circuit which controls the amplitude of the carrier in accordance with the magnitude of said analog voltage from said encoding means and the phase of the carrier in accordance with the polarity of said analog voltage.

9. A data transmission system as claimed in claim 8 with additionally means at the receiver for doubling the frequency of the received carrier wave; and means for dividing by two said doubled carrier wave frequency to provide a reference signal for detecting the phase of the received carrier wave.

10. A digital data transmission system as claimed in claim 1 wherein said encoder comprises, a counter responsive to forward and reverse signals for respectively increasing in count or decreasing in count so as to count between a maximum and minimum count;

bistable means actuated by the accumulation of said maximum count in said counter for generating said reverse signal and actuated by the accumulation of said minimum count in said counter for generating said forward signal;

means for varying said counter maximum and minimum counts; and, means for generating an output voltage proportional to the count accumulated by said counter.

References Cited

UNITED STATES PATENTS 2,537,427 1/1951 Seid et al.
3,128,342 4/1964 Baker ______________ 178—67 X RALPH D. BLAKESLEE, Primary Examiner WILLIAM S. FROMMER, Assistant Examiner U.S. Cl. X.R.

325—38; 340—167, 347